US007652825B2

(12) United States Patent
Nakamura et al.

(10) Patent No.: US 7,652,825 B2
(45) Date of Patent: Jan. 26, 2010

(54) COVER FOR HEAD-UP DISPLAY

(75) Inventors: Go Nakamura, Shizuoka (JP); Kunimitsu Aoki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 25 days.

(21) Appl. No.: 11/882,510

(22) Filed: Aug. 2, 2007

(65) Prior Publication Data

US 2008/0049331 A1 Feb. 28, 2008

(51) Int. Cl.
*G02B 27/14* (2006.01)
*G09G 5/00* (2006.01)
*G02F 1/1335* (2006.01)

(52) U.S. Cl. .............................. 359/630; 345/7; 349/11
(58) Field of Classification Search ......... 359/630–634, 359/13–14; 345/7, 9; 348/115; 353/11–12, 353/28, 119; 349/11; 340/438, 980, 995.1, 340/815.47, 815.74
See application file for complete search history.

(56) References Cited

U.S. PATENT DOCUMENTS 6,608,608 B2 * 8/2003 Kanamori ..................... 345/8

FOREIGN PATENT DOCUMENTS

| DE | 1299435 | 7/1969 |
| DE | 4227582 | 2/1993 |
| DE | 10346884 | 5/2004 |
| JP | 2005-75230 | 3/2005 |

OTHER PUBLICATIONS

Office Action dated Apr. 24, 2008, issued on the corresponding German patent application and the translation thereof.

* cited by examiner

*Primary Examiner*—Scott J Sugarman
*Assistant Examiner*—Dawayne A Pinkney
(74) *Attorney, Agent, or Firm*—Edwards Angell Palmer & Dodge LLP

(57) ABSTRACT

A display includes a case and a display source received in the case, and allows a virtual image of an image displayed on the display source projected on a windshield of a vehicle through an opening of the case to be superimposed on a foreground image through the windshield which is visually recognized at an eye point of the vehicle. A cover for the display is configured to prevent foreign particles from entering an inside of the case through the opening, and allows the image projected from the display source to pass therethrough. The cover has substantially a wedge cross section so as to align a substantially straight light path of direct light from an arbitrary point on the display source through the cover without reflection with a reflected light path of reflected light from the arbitrary point and reflected twice on inner surfaces of the cover.

5 Claims, 7 Drawing Sheets

COVER FOR HEAD-UP DISPLAY

CROSS REFERENCE TO RELATED APPLICATIONS

This application is on the basis of Japanese Patent Application No. 2006-213473, the contents of which are hereby incorporated by reference.

BACKGROUND OF THE INVENTION

1. Field of the Invention

The present invention relates to a cover used in a head-up display, and to a display unit for a vehicle using the cover.

2. Description of the Related Art

Recently, a head-up display has been used in a vehicle for displaying a virtual image of data, which is not allowed to be displayed on a meter unit due to its narrow space, on a windshield so that a driver can visually recognize the virtual image superimposed on a foreground image which is seen through the windshield. Japanese published patent application No. 2005-75230 discloses one of conventional head-up displays. This conventional head-up display (HUD) includes a dust cover (a shutter as a protecting member), and a cleaning member for removing foreign particles from a displaying member.

Conventionally, the HUD includes a dust cover for preventing dust from entering an inside of the HUD. If this cover is thin, a vehicle driver may unintentionally break the cover, or heat may deform the cover. Further, it is difficult to form such a thin cover. Therefore, there is a demand to use a thick cover.

However, if the cover is thick, displaying light is reflected on inner surfaces of the cover, and reaches an eye point of a vehicle so that a driver watches a doubled virtual image on the windshield. We found that as a thickness of the cover increases, intensity of the reflected light increases.

Accordingly, an object of the present invention is to provide a cover for a head-up display and a display unit for a vehicle to prevent foreign objects from entering an inside of the display and to prevent a ghost from occurring even with a thick cover.

SUMMARY OF THE INVENTION

In order to attain the object, according to the present invention, there is provided a cover for a head-up display, said display including a case and a display source received in the case, and allowing a virtual image of an image displayed on the display source projected on a windshield of a vehicle through an opening of the case to be superimposed on a foreground image through the windshield which is visually recognized at an eye point of the vehicle, said cover configured to prevent foreign particles from entering an inside of the case through the opening, and allowing the image projected from the display source to pass therethrough, wherein said cover has substantially a wedge cross section so as to align a substantially straight light path of direct light from an arbitrary point on the display source through the cover without reflection with a reflected light path of reflected light from the arbitrary point and reflected twice on inner surfaces of the cover.

According to the above, the substantially straight light path of the direct light from the arbitrary point on the display source through the cover without reflection is aligned with the reflected light path of the reflected light from the arbitrary point reflected twice on the inner surfaces of the cover. Therefore, both light paths are reflected toward an eye point of a vehicle driver.

Preferably, the cover is so formed that the reflected light emitted from the arbitrary point and reflected on an inside of an emitting surface as one of the inner surfaces of the cover passes toward a refraction point on an incident surface as the other one of the inner surfaces of the cover away from the windshield where the direct light from the arbitrary point is refracted, and the reflected light is on the same path from the refraction point to the windshield as the direct light.

According to the above, the reflected light reflected at the inner surface of the cover near the windshield is reflected again at the refraction point in a same direction as the direct light. Therefore, the direct light and the reflected light are surely overlapped with each other.

Preferably, the emitting surface near the windshield of the cover is formed in a curved shape so as to reflect outside light passing through the windshield to directions except a direction toward an eye point of a vehicle driver.

According to the above, the outside light passing through the windshield is reflected on the outer wall of the case to directions out of the eye point. Therefore, the outside light reflected on the cover is surely prevented from projecting toward the eye point.

According to the present invention, there is provided a display unit for a vehicle including:

a head-up display including a case and a display source received in the case, and allowing a virtual image of an image displayed on the display source projected on a windshield of a vehicle through an opening of the case to be superimposed on a foreground image through the windshield; and a cover for the head-up display as claimed in any one of claims 1 to 3.

According to the above, the cover is mounted on the head-up display to prevent foreign particles from entering an opening of the case. The direct light passing through the cover and the reflected light reflected on inside surfaces of the cover are overlapped with each other and projected to the windshield, so that the direct light and the reflected light are overlapped with each other at the eye point.

These and other objects, features, and advantages of the present invention will become more apparent upon reading of the following detailed description along with the accompanied drawings.

DETAILED DESCRIPTION OF THE PREFERRED EMBODIMENTS

An embodiment of a display unit for a vehicle having a cover for a head-up display according to the present invention will be explained with reference to FIGS. 1 to 5.

Figure 1:
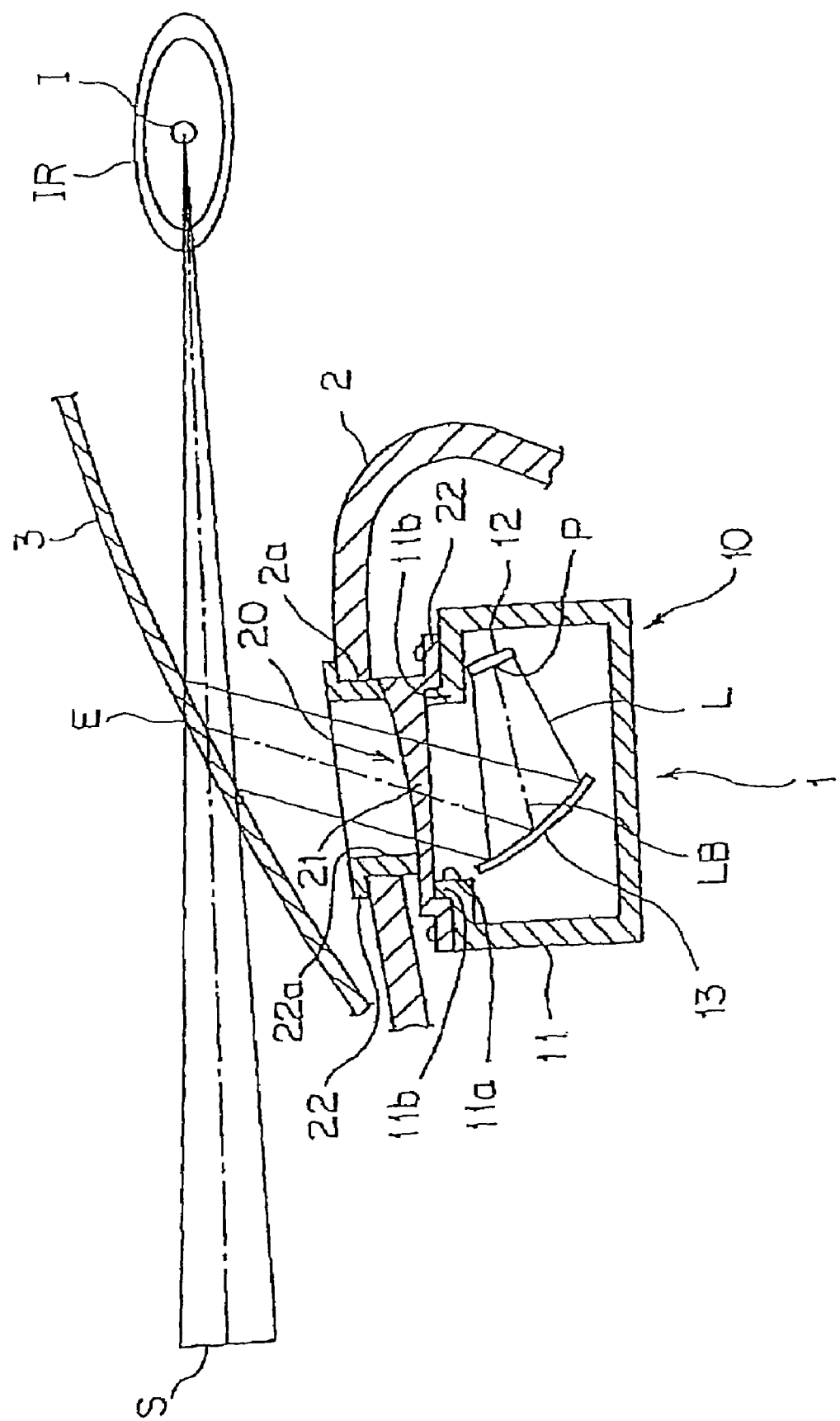
FIG. 1 is a schematic diagram showing one embodiment of a cover for a head-up display, and a display unit for a vehicle according to the present invention.

In FIG. 1, a display unit for a vehicle 1 is mounted inside an instrument panel 2. The display unit for a vehicle 1 includes a head-up display (HUD) 10, and a cover 20 for the HUD.

The HUD 10 includes a case 11, a display source 12, and a reflecting member 13. The case 11 receives the display source 12 and the reflecting member 13. The case 11 is formed in a substantially box shape, made of synthetic resin, metal, or the like, and includes an opening 11a communicating with an opening 2a of the instrument panel 2. A size and a shape of the opening 11a are so formed as not to block display light L from the display source 12.

A light emitting device such as a field emission display, a fluorescent tube, an electroluminescence, or an LCD display with a backlight is used as the display source 12. The display source 12 displays data instructed by a not-shown controller.

A reflecting mirror, a magnifying mirror or the like is used as the reflecting member 13. The reflecting member 13 reflects the display light L displayed on the display source 12 toward a projecting area E on a windshield 3. Namely, the display source 12 and the reflecting member 13 are opposed to each other in the case 11. Incidentally, in this embodiment, only one reflecting member 13 is used. However, the present invention is not limited to this. Various embodiments may be used, for example, a plurality of reflecting members 13 reflects the display light L several times, or for another example, the display light L directly passes to the windshield 3 using no reflecting member 13.

In such an HUD 10, the display light L of an image displayed on the display source 12 is reflected toward the windshield 3 by the reflecting member 13. Then, the display light L passes to the windshield 3 through the opening 11a. Resultingly, a virtual image S of the image displayed on the display source 12 is displayed on the projecting area E on the windshield 3. Thus, a foreground image through the windshield 3 and the virtual image S are visually overlapped with each other at an eye point I of a vehicle driver.

The HUD 10 includes a not-shown position adjusting mechanism configured to adjust a position of the virtual image S for ensuring visibility of the virtual image S even when the eye point I is moved inside an eye range IR.

The cover 20 for HUD is made of translucent synthetic resin or the like. The cover 20 is so mounted as to prevent foreign particles from entering an inside of the case 11 through the opening 11a. The display light L passes through the cover 20 toward the windshield 3. In this embodiment, the cover 20 closes the opening 11a by abutting on a part 11b vertically extended from an edge of the opening 11a.

The cover 20 includes a cover body 21 and a fixed part 22 extended around the cover body 21. The cover body 21 and the fixed part 22 are formed integrally with each other. The cover body 21 is formed in a substantially wedge-shaped section so that the light LB directly through the cover body 21 from the arbitrary point P of the display light L on the display source 12 and the reflected light reflected twice on inner surfaces of the cover body 21 from the arbitrary point P are aligned with each other.

Incidentally, in this embodiment, the display light L is defined as whole light from the display source 12. The direct light LB is defined as light from the arbitrary point P of the display light L. For simplifying an explanation of this embodiment, hereunder, a case that the arbitrary point P is the center of the display light L will be explained.

The fixed part 22 is fixed to the case 11 with a fixing member such as a screw in a manner that the fixed part 22 is engaged with an outer wall of the case 11 and a vertically extended part 11b. The fixed part 22 includes a light shield wall 22a extending from the instrument panel 2 to the cover body 21. Incidentally, in this embodiment, a case that the cover 20 is fixed to the case 11 will be explained. However, the present invention is not limited to this. Various embodiments can be used, for example, the cover 20 may be engaged with the instrument panel 2 or fitted into the cover 20.

Next, an example of a design method for a substantially wedge-shaped section of the cover 20 will be explained with reference to FIGS. 3 to 6.

Figure 3:
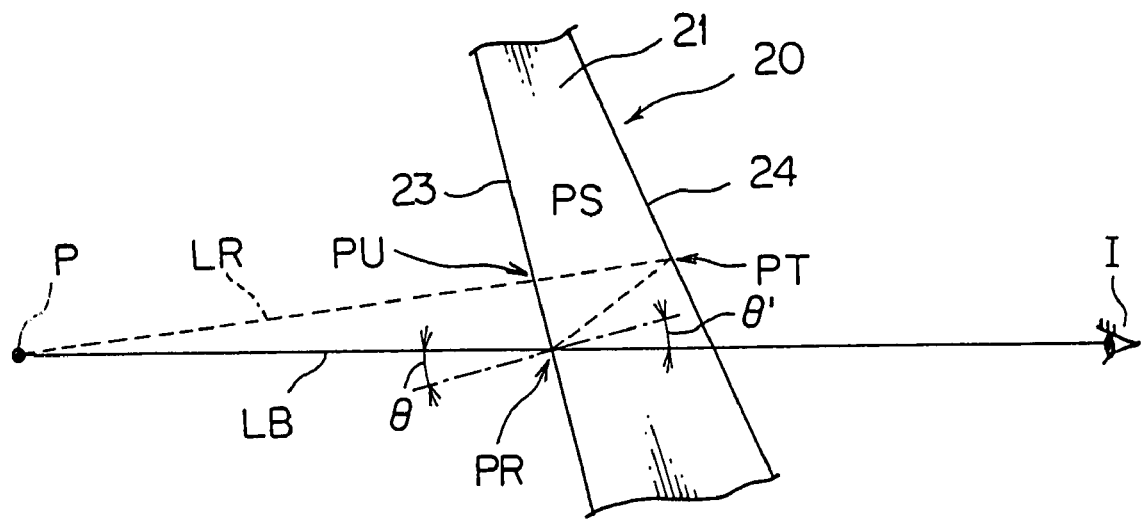
FIG. 3 is an explanatory view showing a relationship between the direct light and the reflected light.

As shown in FIG. 3, a condition for aligning the light LB with the light LR is following conditions 1 and 2. The condition 1 is that the light path of the direct light LB at a refraction point PR on an incident surface (rear surface) 23 of the cover body 21 is aligned with the light path of the reflected light LR at a reflection point PS which is previously reflected at a reflection point PT on an inside of an emitting surface 24 of the cover body 21. The condition 2 is that the refraction point PR is aligned with the reflection point PS.

For satisfying the conditions, it is necessary that an incident angle of the refraction point PR and the reflection point PS are aligned with a refraction angle θ' of the direct light LB. Therefore, the cover body 21 is formed in a substantially wedge-shaped section so that an incident angle at the incident surface 23 (rear surface of the cover body 21 away from the windshield 3) is different from an incident angle at the emitting surface 24 (front surface of the cover body 21 near the windshield 3).

Figure 4:
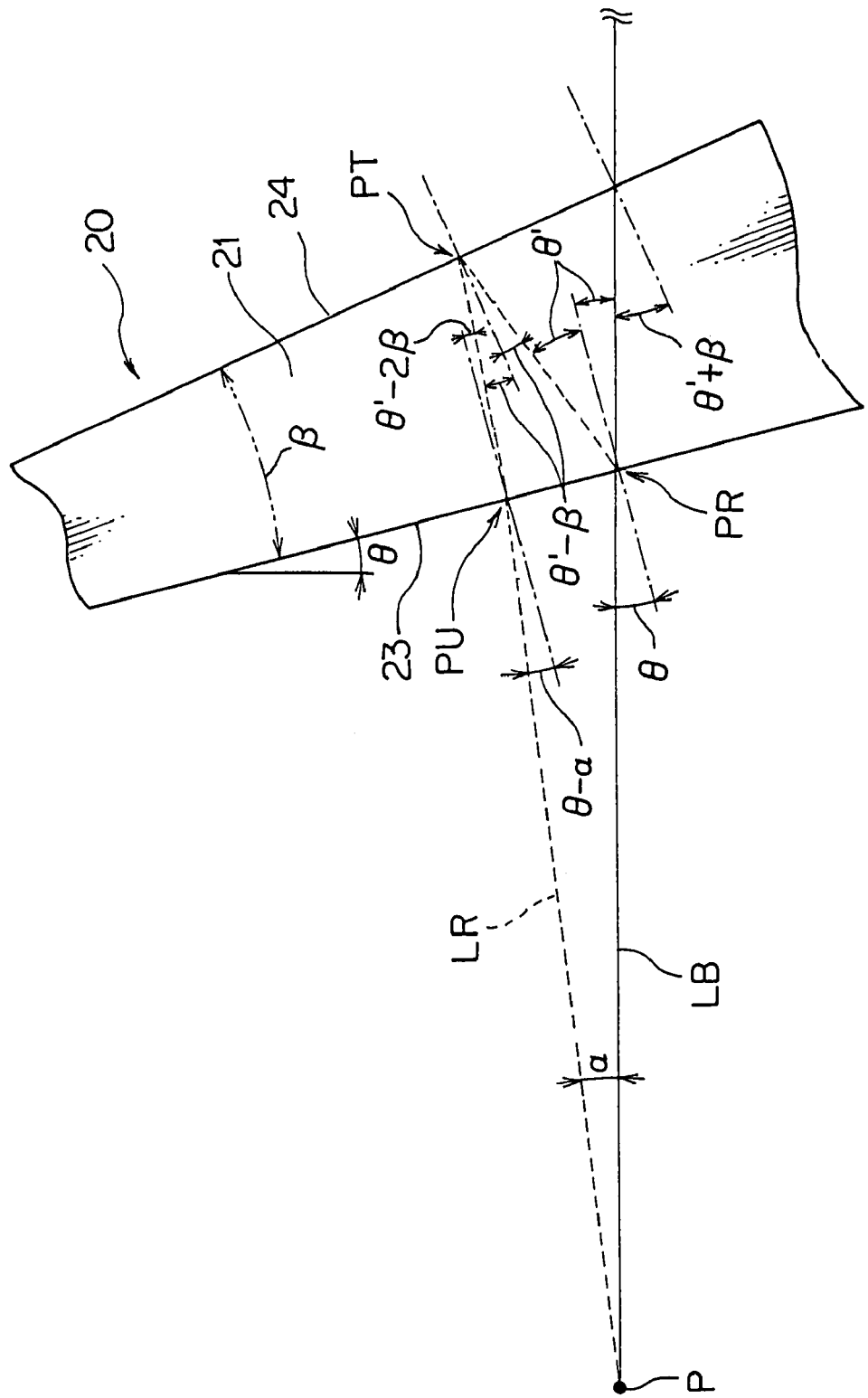
FIG. 4 is an explanatory view showing a cover design method for aligning a reflected light path of the reflected light with a substantially straight light path of the direct light refracted at a refraction point.

Regarding the condition 1, as shown in FIG. 4, an angle between the direct light LB and the reflected light LR is defined as α. A wedge angle of the cover body 21 is defined as β. An angle between the incident surface 23 and the direct light LB is defined as θ. The refraction angle of the direct light LB is defined as θ'.

Because the reflection angle of the reflected light LR at the incident surface 23 should be aligned with the refraction angle of the direct light LB at the incident surface 23, the reflection angle is θ'. Because the wedge angle is β, the reflection angle at the emitting surface 24 is θ'-β. Further, the refraction angle at the incident surface 23 becomes θ'-2β (1). Here, the incident light of the reflected light LR to the incident surface 23 is θ-α (2).

An expression is obtained using (1), (2), and Snell's law.

$$n^* \sin(\theta - \alpha) = n'^* \sin(\theta - 2\beta)$$

where n is a refractive index of the air, and n' is a refractive index of the cover body 21.

When developing the expression about α, an expression 3 is obtained.

$$\alpha = \theta - \sin^{-1}\{n'/n^* \sin(\theta' - 2\beta)\} \quad (3)$$

Figure 5:
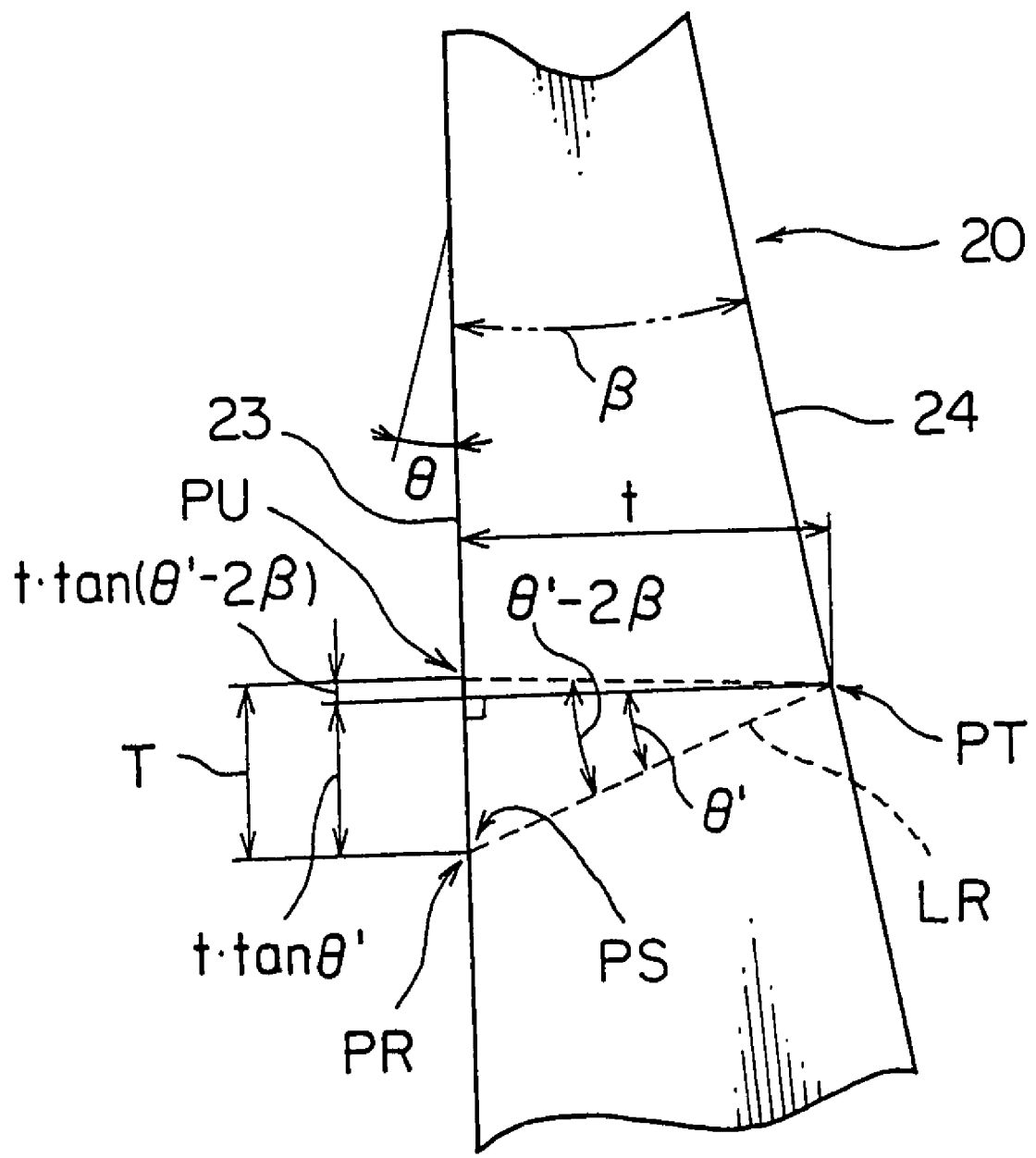
FIG. 5 is an explanatory view showing a calculation method of a distance between a reflection point and the refraction point.

Next, regarding the condition 2, as shown in FIG. 5, a distance of a perpendicular line from the reflection point PT to the incident surface 23 is defined as t.

Firstly, a distance T between the refraction point PU and the reflection point PS of the reflected light LR is obtained.

$$T = t^* \tan(\theta' - 2\beta) + t^* \tan \theta' \quad (4)$$

Figure 6:
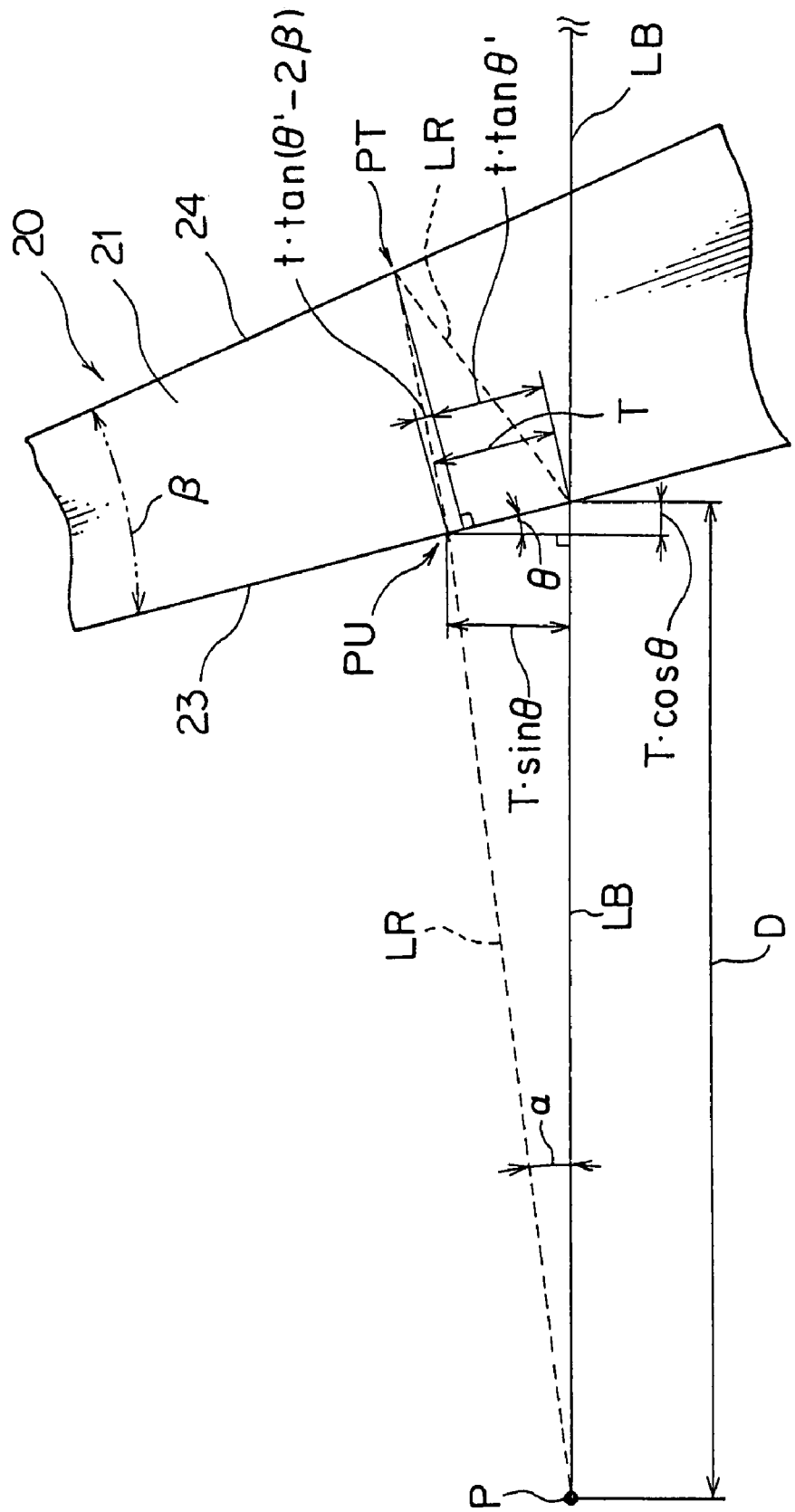
FIG. 6 is an explanatory view showing a calculation method of an angle between the direct light and the reflected light at the arbitrary point.

Next, as shown in FIG. 6, a distance D from the display source 12 to the cover body 21 is obtained.

$$D = T^* \sin\theta / \tan\alpha + T^* \cos\theta$$

When developing the expression about α, an expression 5 is obtained.

$$\alpha = \tan^{-}\{T^* \sin\theta / (D - T^* \cos\theta)\} \qquad (5)$$

Thus, by adjusting the wedge angle β for realizing the expressions (3) and (5), the direct light LB and the reflected light LR are aligned with each other. By applying this process to other arbitrary points, the ghost image is further surely prevented.

When the arbitrary point P is at the center of the display source 12, and the eye point I is at the center of the eye range IR, other arbitrary points occurs the ghost image. However, there is no problem if a difference between the lights LB and the LR is under a resolution of a human eye. Further, it is possible that a margin of the resolution of the human eye is assigned to a manufacturing tolerance of the cover 20 or an error of the HUD mounting on a vehicle.

Figure 2:
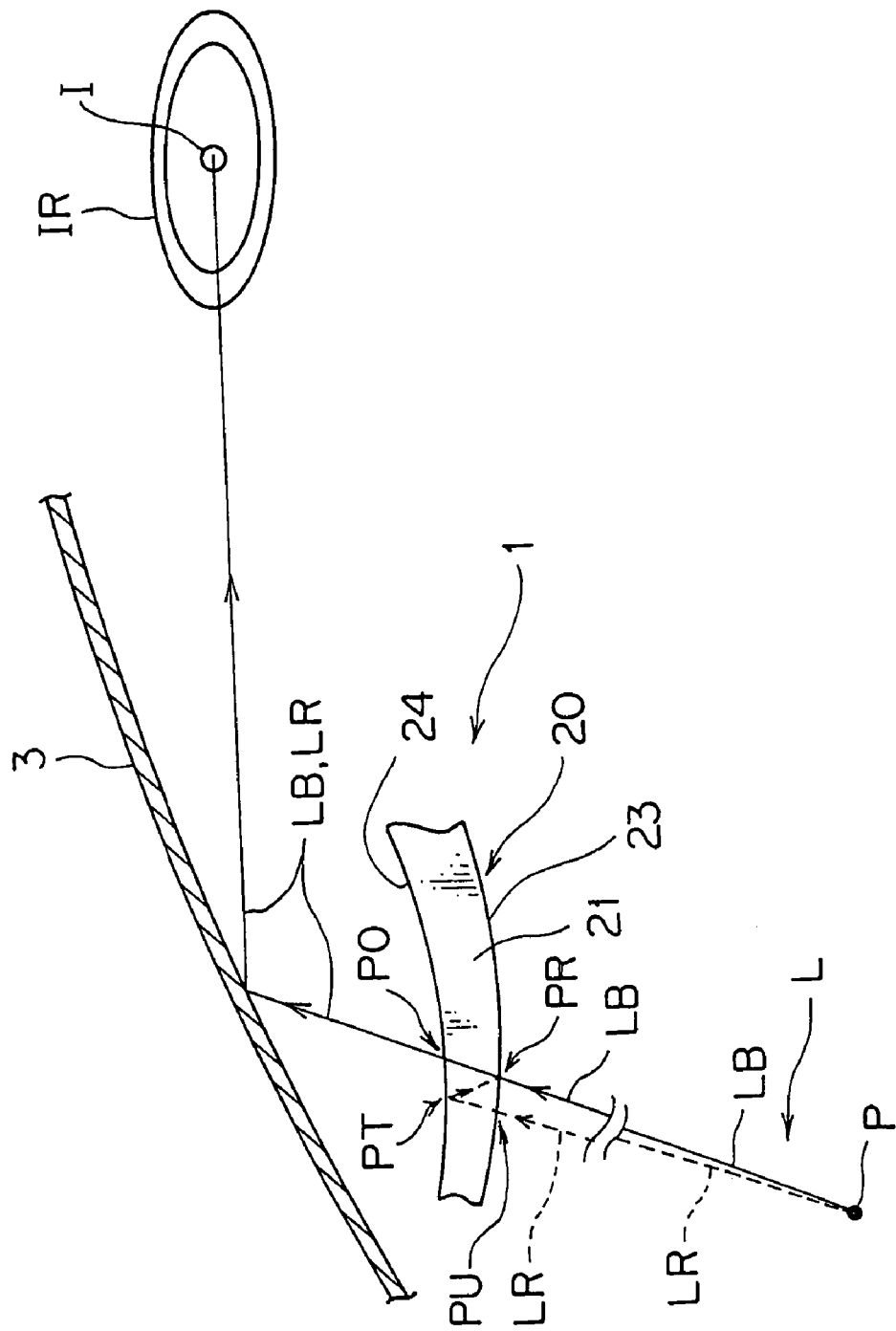
FIG. 2 is an explanatory view showing an operation of direct light and reflected light at the cover in FIG. 1.

Next, an example of a projecting operation of the direct light LB in the display unit for a vehicle according to the present invention will be explained with reference to FIG. 2.

In the HUD 10, the display light L displayed on the display source 12 is reflected on a reflecting member 13 toward the windshield 3. The direct light LB of the display light L at the arbitrary point P is refracted at the refraction point PR on the incident surface 23 of the cover body 21 and enters an inside of the cover body 21. On the other hand, the reflected light LR is refracted at the refraction point PU on the incident surface 23 and enters the inside of the cover body 21. Then, the reflected light LR is reflected at the reflection point PT toward the refraction point PR on the incident surface 23. Then, the reflected light LR is reflected at the refraction point PR, namely, the reflection point PS to a same direction as the direct light LB.

Thus, superimposed light LB.LR in which the direct light LB and the reflected light LR are overlapped with each other passes toward a refraction point PO of the emitting surface 24. Then, the superimposed light LB. LR is refracted at the refraction point PO, and passes toward the windshield 3. Then, the superimposed light LB.LR is reflected on the windshield 3 toward the eye point I. Thus, because the direct light LB and the reflected light LR are overlapped with each other in the cover body 21, the ghost image (double image) of the display light L is prevented from occurring.

According to the above described cover 20 for an HUD, because the cover body 21 has a substantially wedge shaped section, the direct light LB and the reflected light are overlapped with each other in the cover body 21, and the ghost image can be removed. Accordingly, even if the thickness of the cover body 21 is increased, the visibility of the virtual image is not worse, and durability of the cover 20 is improved. Further, because formability of the thick cover body 21 is easier, productivity of the cover 20 is improved, and assemble ability is improved.

Incidentally, in this embodiment, the reflected light LR is reflected toward the refraction point PR of the direct light LB, then reflected again at the refraction point PR so that the reflected light LR is overlapped with the direct light LR. However, the present invention is not limited to this. Various shapes can be used as the section of the cover 20 until the reflected light LB is finally overlapped with the direct light LR before the eye point I.

Figure 7:
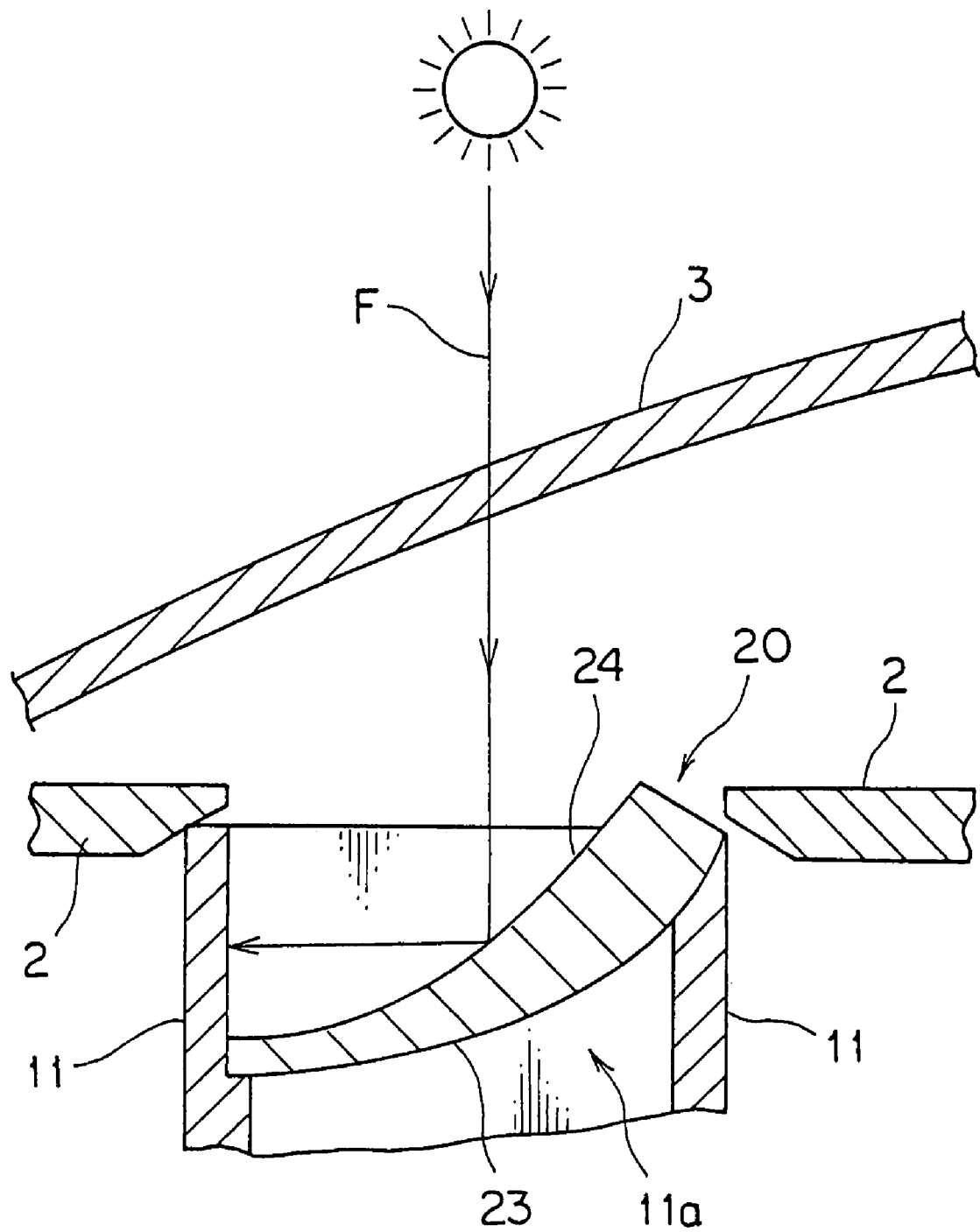
FIG. 7 is an explanatory view showing an example of the cover having a specific shape for removing a ghost image caused by outside light.

Further, as shown in FIG. 7, the emitting surface 24 may be formed so that the emitting surface 24 reflects outside light F which passes through the windshield 3 toward directions except the eye point I (left side in FIG. 7). Namely, the emitting surface 24 may have a curved surface to collect the outside light F to the light shield wall 22a as an inside wall of the case 11. In this case, the ghost image owing to the outside light F is prevented from occurring, and a driver is prevented from being dazzled.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A cover for a head-up display,
    said display including a case and a display source received in the case, and allowing a virtual image of an image displayed on the display source projected on a windshield of a vehicle through an opening of the case to be superimposed on a foreground image through the windshield which is visually recognized at an eye point of the vehicle,
    said cover configured to prevent foreign particles from entering an inside of the case through the opening, and allowing the image projected from the display source to pass therethrough,
    wherein said cover has substantially a wedge cross section so as to align a substantially straight light path of direct light from an arbitrary point on the display source through the cover without reflection with a reflected light path of reflected light from the arbitrary point and reflected twice on inner surfaces of the cover,
    wherein the cover is so formed that the reflected light emitted from the arbitrary point and reflected on an inside of an emitting surface as one of the inner surfaces of the cover passes toward a refraction point on an incident surface as the other one of the inner surfaces of the cover away from the windshield where the direct light from the arbitrary point is refracted, and the reflected light is on the same path from the refraction point to the windshield as the direct light.

2. The cover as claimed in claim 1,
    wherein an emitting surface of the cover nearest the windshield is formed in a curved shape so as to reflect outside light passing through the windshield to directions except a direction toward an eye point of a vehicle driver.

3. A display unit for a vehicle comprising:
    a head-up display including a case and a display source received in the case, and allowing a virtual image of an image displayed on the display source projected on a windshield of a vehicle through an opening of the case to be superimposed on a foreground image through the windshield; and
    a cover for the head-up display as claimed in claim 1.

4. A display unit for a vehicle comprising:
    a head-up display including a case and a display source received in the case, and allowing a virtual image of an image displayed on the display source projected on a windshield of a vehicle through an opening of the case to be superimposed on a foreground image through the windshield; and
    a cover for the head-up display as claimed in claim 2.

5. The cover as claimed in claim 1, wherein the wedge cross section has a wedge angle β and the expressions for α are satisfied, $$\alpha = \theta - \sin^{-1}\{n'/n * \sin(\theta' - 2\beta)\}$$

$$\alpha = \tan^{-1}\{T * \sin\theta / (D - T * \cos\theta)\}$$

with $\alpha$ being the angle between the direct light and the reflected light, $\theta$ being an angle between an incident light surface of the cover and the direct light $\theta'$ being a refraction angle of the direct light, n is a refractive index of the air n' is a refractive index of the cover, T is a distance on the cover between a refraction point and a reflection point of the reflected light and D is the distance from the display source to the cover, and whereby the direct light and the reflected light are aligned with each other.

* * * * *